US012354332B2

(12) United States Patent
Wang et al.

(10) Patent No.: US 12,354,332 B2
(45) Date of Patent: Jul. 8, 2025

(54) DEVICE AND METHOD TO IMPROVE SYNTHETIC IMAGE GENERATION OF IMAGE-TO-IMAGE TRANSLATION OF INDUSTRIAL IMAGES

(71) Applicant: Robert Bosch GmbH, Stuttgart (DE)

(72) Inventors: Ruyu Wang, Leonberg (DE); Sabrina Hoppe, Tiefenbronn (DE); Eduardo Monari, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 386 days.

(21) Appl. No.: 17/897,007

(22) Filed: Aug. 26, 2022

(65) Prior Publication Data

US 2023/0095041 A1 Mar. 30, 2023

(30) Foreign Application Priority Data

Sep. 24, 2021 (EP) .................................... 21198762

(51) Int. Cl.

*G06V 10/774* (2022.01)
*G06T 7/194* (2017.01)
*G06V 10/82* (2022.01)

(52) U.S. Cl.

CPC ............ *G06V 10/774* (2022.01); *G06T 7/194* (2017.01); *G06V 10/82* (2022.01)

(58) Field of Classification Search

CPC ........... G06T 7/194; G06T 7/168; G06T 9/00; G06T 9/007; G06T 2207/20048; G06T 2207/20052; G06T 2207/20061; G06T 2207/20064; G06V 10/774; G06V 10/809; G06V 10/82; G06V 10/77; G06V 10/7715; G06V 30/18143; G06V 10/467

See application file for complete search history.

(56) References Cited

U.S. PATENT DOCUMENTS

| | | | | |
|---|---|---|---|---|
| 2019/0147320 A1* | 5/2019 | Mattyus | G06V 20/182 382/155 |
| 2019/0279075 A1* | 9/2019 | Liu | G06N 3/047 |
| 2019/0295302 A1* | 9/2019 | Fu | G06T 11/00 |
| 2020/0302251 A1* | 9/2020 | Shechtman | G06V 20/20 |
| 2020/0349447 A1* | 11/2020 | Zhong | G06N 3/045 |
| 2021/0027470 A1* | 1/2021 | Lin | G06T 11/60 |

OTHER PUBLICATIONS

Zhang G, Cui K, Hung TY, Lu S. Defect-GAN: High-Fidelity Defect Synthesis for Automated Defect Inspection. arXiv preprint arXiv: 2103.15158. Mar. 28, 2021 (Year: 2021).*

(Continued)

*Primary Examiner* — Oneal R Mistry
*Assistant Examiner* — Duy Tran
(74) *Attorney, Agent, or Firm* — NORTON ROSE FULBRIGHT US LLP

(57) ABSTRACT

A computer-implemented method of training a generator for transforming a given image according to a given target foreground domain is disclosed. A generator, discriminator, Mapping network, and a Style-Content encoder are trained. Furthermore, a method of image to image translation according to a given target foreground domain by the trained generator is provided. The generator may be trained to generate images depicting defects.

13 Claims, 11 Drawing Sheets

S41 — provide set of training data
S42 — determine statistic over training data set
S43 — determine class of labels
S44 — determine target foreground domain, determine synthetic image
S45 — add sythetic image to training data set

(56) References Cited

OTHER PUBLICATIONS

Choi et al., "Stargan V2: Diverse Image Synthesis for Multiple Domains," IEEE/CVF Conference On Computer Vision and Pattern Recognition (CVPR), 2020, pp. 8188-8197. <https://openaccess.thecvf.com/content_CVPR_2020/papers/Choi_StarGAN_v2_Diverse_Image_Synthesis_for_Multiple_Domains_CVPR_2020_paper.pdf> Downloaded Aug. 23, 2022.

Huang et al., "Arbitrary Style Transfer in Real-Time With Adaptive Instance Normalization," IEEE International Conference On Computer Vision (ICCV), 2017, pp. 1501-1510. <https://openaccess.thecvf.com/content_ICCV_2017/papers/Huang_Arbitrary_Style_Transfer_ICCV_2017_paper.pdf> Downloaded Aug. 23, 2022.

Zhang et al., "Defect-Gan: High-Fidelity Defect Synthesis for Automated Defect Inspection," 2021 IEEE Winter Conference On Applications of Computer Vision (WACV), 2021, pp. 2523-2533.

Singh et al., "Generative Adversarial Networks for Synthetic Defect Generation in Assembly and Test Manufacturing," 2020 31ST Annual Semi Advanced Semiconductor Manufacturing Conference (ASMC), 2020, pp. 1-5.

Niu et al., " Defect Image Sample Generation With GaN for Improving Defect Recognition," IEEE Transactions On Automation Science and Engineering, vol. 17, No. 3., 2020, pp. 1611-1622.

* cited by examiner

DEVICE AND METHOD TO IMPROVE SYNTHETIC IMAGE GENERATION OF IMAGE-TO-IMAGE TRANSLATION OF INDUSTRIAL IMAGES

CROSS REFERENCE

The present application claims the benefit under 35 U.S.C. § 119 of European Patent Application No. EP 21 19 8762.3 filed on Sep. 24, 2021, which is expressly incorporated herein by reference in its entirety.

FIELD

The present invention concerns a method of training a generator for transforming a given image according to a given target foreground domain and a method of image to image translation by the trained generator and a computer program and a machine-readable storage medium, a classifier, a control system, and a training system configured to carry out the methods.

BACKGROUND INFORMATION

Generative Adversarial Networks (GANs) are well-known to generate synthetic data that mimics real data. The learning paradigm for training GANs can be summarized that a generator, which generates the synthetic data, and a discriminator, which distinguishes between real and synthetic data, compete against each other such that the outputs of both models improve during training.

GANs can be used for image-to-image translation, which aims to transform a visual representation of a given image to differently predefined visual representation. For example, images of a first domain can be transformed such that they represent a second domain. The term domain implies that a set of images can be grouped as a visually distinctive category and each image has a unique appearance, which can be referred to as style. A first domain could be 'day' and the second domain could be 'night'. A generator for this specific image translation transforms the visual representation images of the domain 'day' to 'night'. Ideally, the style of the generated 'night'-images is preserved.

Choi, Yunjey, et al., "StarGAN v2: Diverse image synthesis for multiple domains." Proceedings of the IEEE/CVF Conference on Computer Vision and Pattern Recognition. 2020, online available: openaccess.thecvf.com/content_CVPR_2020/papers/Choi_StarGAN_v2_Diverse_Image_Synthesis_for_Multiple_Domains_CVPR_2020 paper.pdf, describes an image-to-image framework model called 'StarGAN v2', which can learn and carry out image translations by changing the style of the image to a given style. The given style is provided either by a Mapping network or by a Style Encoder network.

SUMMARY

An object of the present invention is to generate synthetic defective images to enrich a training set of a defect detector/classifier for, e.g., industrial optical inspection. In order to generate synthetic defective images, it is sometimes necessary to change just a specific area of the image without modifying neighboring areas.

According to an example embodiment of the present invention, the style and the content (i.e. defect) of an image are learned separately through a generator by specific loss functions, which allows the generator to focus on generating defective samples with novel defect patterns without being interfered by the background style.

Therefore, it is possible not to change the background when generating new defective image. Owing to this advantage, the generator can transfer an existing defect from a reference image to other images.

A further advantage of the present invention is given by a weakly-unsupervised learning of the disentanglement of the style and the content of an image. Both style and content can then be either randomly generated to produce a large variance of synthetic images or they can generated from one or two reference images, e.g. to combine the defect from one image with the background/product from another image and additionally the style of the defect can be varied to further enhance the variance of generated images, which is currently not possible by the state of the art.

A further advantage of the present invention is that the defective samples can be generated with higher variance in the pattern of defects regarding their structural shape and styles (e.g. light/medium/heavy strokes). This advantage owns to the disentanglement of foreground and background and owns to a diversity loss that punish different style and content pairs for the same output image. Hence, an improved diversity of synthetically generated defects is achieved.

Consequently, the present invention can significantly improve an imbalanced dataset that contains different amount of defective samples from different products even when the defective samples from one of the products is limited to a small amount (i.e. 20), because the present invention can transfer defects from a product type with more samples to the backgrounds from the product type with less samples.

By disentangling defects from their background and by only focusing on modeling the defects, surprisingly the model can be trained with very limited data.

In a first aspect of the present invention, a computer-implemented method of training a generator for transforming a given image (x) according to a given target foreground domain ($\tilde{y}$) is provided. More precisely, according to an example embodiment of the present invention, the generator will be trained such that after training, it is configured to replace a part of the given image, which is currently present as the foreground of the given image, by a new part that illustrate the class of the new foreground. Hence, the generated image by the generator comprise a new foreground that shows the target foreground domain. The part of the image can be a group of pixels related in content.

According to an example embodiment of the present invention, the method starts with a step of generating a target style code ($\tilde{s}$) and target content code ($\tilde{c}$) by a Mapping network depending on the given target foreground domain ($\tilde{y}$) and preferably depending on a randomly generated noise vector (z). The foreground domain can characterize a class of a new foreground of the given image. Both codes represent a machine-readable coding or a coding for the generator of the foreground domain. For example, the target content code can encode a type of the foreground domain and the target content code can encode an appearance of said content, like an orientation or a size, etc. The Mapping network is suited to determine depending on a noise vector and a given foreground domain both codes and preferably, the Mapping network is a neural network comprising a first plurality of layers which are connected in series, wherein the output of said series is inputted into one decoder for the content and one multi-layer perceptron for the style, which output a content code and style code respectively.

Afterwards, it follows a propagation of the given image (x) through an encoder of the generator. Under the term propagation, it can be understood that an input is proceeded by the encoder or generator, etc. according to a sequence of processing steps defined by its (internal) structure. Then, a first part of a latent feature map ($FG_G$) outputted by the encoder is replaced by the generated target content code ($\tilde{c}$).

Afterwards, a propagation of the replaced first part of the latent feature map ($FG_A=\tilde{c}$) through a first decoder of the generator is carried out, wherein the target style code ($\tilde{s}$) is injected into the first decoder at the same time. A second part of the latent feature map ($BG_G$) is propagated through a second decoder of the generator. The second part of the latent feature map ($BG_G$) can correspond to the remaining part of the latent feature map without the first part of the latent feature map ($FG_G$). The injection of the target style code ($\tilde{s}$) is carried out during the propagation. This means that while the first part of the replaced latent feature map ($FG_G$) is iteratively proceeded by layers of the first decoder, at predefined layers, the target style code ($\tilde{s}$) is injected as an additional input of the respective layer such that the information of the target style code ($\tilde{s}$) are co-proceeded by the respective layer. More precisely, the style code is the input to a normalization layer and is used to compute mean and variance to adjust the normalization accordingly.

Afterwards, a merging the output of the first and second decoder of the generator to an output image ($G(x, \tilde{s}, \tilde{c})$) of the generator is carried out. Preferably, the merging is carried out by superposing but outputs such that the output of the first decoder is put on the output of the second decoder. Preferably, this can be done by a concatenation, wherein the outputs are 3D and they are concatenated along the third dimension.

Afterwards, a propagation of an input image ($x_{in,D}$) through a discriminator is carried out. The image is either the outputted image ($G(x, \tilde{s}, \tilde{c})$) of the generator or an image of a training data set, wherein the discriminator outputs whether its input image ($x_{in,D}$) is either an image of the training data set or generated by the generator. The training data set can comprise images that are real world images, in particular captured by a camera. The training data can be structed, in particular labeled, like usually utilized training data for GAN's.

Afterwards, an adversarial loss ($L_{adv}$) of the output of the discriminator as well as a style-content reconstruction loss ($L_{sty\_con}$) is determined. More precisely, the adversarial loss ($L_{adv}$) represents a typical loss utilized to evaluate the performance of the generator and discriminator at the same time, also well-known as min-max loss. Formally, the adversarial loss can be given as: $L_{adv}=E_{x,y}[\log D_y(x)]+E_{x,\tilde{y},z}[\log(1-D_{\tilde{y}}(G(x, \tilde{s}, \tilde{c})))])$, where $D(x)$ is the discriminator's estimate of a probability that real data instance is real, $E_{x,y}$ is the expected value over all real data instances, $G(\bullet)$ is the generator's output and $D(G(\bullet))$ is the discriminator's estimate of the probability that a fake instance is real.

The style-content reconstruction loss ($L_{sty\_con}=E_{x,\tilde{y},z}[|\tilde{s}-S_E(G(x, \tilde{s}, \tilde{c}))|]+E_{x,\tilde{y},z}[|\tilde{c}-C_E(G(x, \tilde{s}, \tilde{c}))|]$) is determined depending on a difference between the target style code ($\tilde{s}$) and an extracted style code ($S_E$) by a Style-Content encoder depending on the outputted image ($G(x, \tilde{s}, \tilde{c}$) of the generator and depending on a difference between the target content code ($\tilde{c}$) and an extracted content code ($C_E$) by a Style-Content encoder depending on the outputted image ($G(c, \tilde{s}, \tilde{c})$) of the generator. The Style-Content encoder is suited to determine depending on an input image, which can be either the given image or the outputted image of the generator, the content code and style code of its input. Preferably, the Style-Content encoder is a neural network comprising a first plurality of layers which are connected in series, wherein the output of said series is inputted into two encoders, which outputs a content code and style code respectively. Generally, an encoder can comprise a series of layers arranged such that they reduce the dimensionality of an input of the encoder.

Finally, the generator, discriminator, Mapping network and the Style-Content encoder are optimized subject to an objective that the sum of the adversarial loss and the style-content reconstruction loss is minimized by the generator and the Mapping network and the Style-Content encoder and the sum the losses is maximized by the discriminator. The optimization can be carried out by gradient descent, wherein parameters of the models are adjusted depending on estimated gradients.

According to an example embodiment of the present invention, it is provided that the discriminator comprises a first and a second classifier, wherein the first classifier outputs a classification of a background of the input image ($x_{in,D}$) of the discriminator and the second classifier outputs a classification of a foreground of the input image ($x_{in,D}$) of the discriminator, wherein a first and second classification loss ($L_{cls\_fore}=E_{x_{real},y}[\log D_{cls\_fore}(y|x_{real})]+E_{x_{synth},\tilde{y}}[-\log D(\tilde{y}|G(x, s, c))]$, $L_{cls\_back}=E_{x_{real},p}[-\log D_{cls\_back}(p|x_{real})]+E_{x_{synth},\tilde{p}}[-\log D_{cls\_back}(p|G(x, s, c))]$) is determined depending on the output of the first and second classifiers and depending on assigned classes of the foreground and background classes of the input image ($x_{in,D}$) of the discriminator, wherein the sum of losses of the objective comprises also the first and second classification loss. The assigned classes can be extracted from the labels of the training data set if the input image ($x_{in,D}$) has been picked form the training data or the assigned classes can be extracted from the labels of the training data and the target foreground domain.

Furthermore, according to an example embodiment of the present invention, it is provided that a cycle consistency loss ($L_{cyc}$) is determined. More precisely, the cycle consistency loss ($L_{cyc}$) determines a difference between the given image and the output of the generator after two rounds of replacing the first part of the latent feature map such that after the second round the original given image should be present. More precisely, during the first round, the given image is transformed according to the target foreground domain by replacing the first part of the latent feature map by the target content code and the first part of the latent feature map of the given image is stored, wherein for the second round, the outputted image of the generator is inputted into the generator and the first part of the latent feature map is replaced with the stored one of the given image.

Formally, the cycle-consistency loss can be given as: $L_{cyc}=E_{x,y,\tilde{y},z}[|x-G(G(x, \tilde{s}, \tilde{c}), \hat{s}, \hat{c})|]$.

Furthermore, according to an example embodiment of the present invention, it is provided that a content consistency loss ($L_{con\_cyc}$) is determined. The content consistency loss ($L_{eon\_cyc}$) is determined depending on

- a first difference between the predefined content code and extracted first part of the latent feature map ($FG_G$) of the image obtained after the second round of cyclic transforming the given image. The content consistency can be additionally determined depending on a second difference between the extracted first part of the latent feature map of the given image and the first part of the latent feature map after two rounds of transforming the given image according to the target foreground domain and back to the original foreground domain of the given image. Formally, the content consistency loss can be given as: $L_{con\_cyc}=E_{x,y,\tilde{y},z}[|FG_G(G(G(x, \tilde{s}, \tilde{c}), \tilde{s}, \tilde{c}))-\tilde{c}|]+E_{x,y,\tilde{y},z}[|FG_G(\bar{G}(x, \tilde{s}, \tilde{c}))-\hat{c}|])$.

Furthermore, according to an example embodiment of the present invention, it is provided that a diversity loss is determined, wherein the diversity loss penalizes a similarity between two outputted images of the generator for different target style code ($\tilde{s}$) and target content code ($\tilde{c}$) for the same target foreground domain. For example, the diversity loss is determined depending on a difference between generated images by the generator in accordance with the same target foreground domain but with different predefined content and style codes.

Furthermore, according to an example embodiment of the present invention, it is provided that noise is injected into a decoder ($C_M$) of the Mapping Network, which outputs the style code. Preferably, an intensity of the noise is determined by a hyperparameter that has been optimized during training of the generator.

In a second aspect of the present invention, a computer-implemented method of image to image translation according to a given target foreground domain by the generator is disclosed, which is preferably trained according to the first aspect of the present invention.

According to an example embodiment of the present invention, the method starts with a step of receiving an image ($x_{in,G}$) and a predefined content code and predefined style code, in particular both codes characterizing together the target foreground domain ($\tilde{y}$).

Afterwards, it follows a step of determining a latent feature map of the image by propagating the image thought the encoder of the generator.

Afterwards, it follows a step of replace the first part of a latent feature map ($FG_G$) by the predefined foreground domain code.

Afterwards, it follows a step of propagating the replaced first part of a latent feature map through the first decoder and propagating the unchanged second part of a latent feature map ($BG_G$) through the second decoder of the generator, wherein a predefined style code is injected into the first decoder during propagating the replaced part of the latent representation through a second decoder.

Afterwards, it follows a step of merging both outputs of the first and second decoder of the generator and outputting the merged output as transformed image.

For the first and second aspect of the present invention, it is provided that the background of the image characterizes, in particular shows, a product surface and the foreground is an anomaly of the background, in particular a defect.

Furthermore, according to an example embodiment of the present invention, it is provided that wherein the outputted transformed image of the generator is added to a training data set, wherein an optical surface defect detector is trained depending on this augmented training data set.

In further aspects of the present invention, it is envisioned to use said optical surface defect detector, referred to as a classifier herein, by a method comprising the steps of: receiving a sensor signal comprising data from a sensor. The sensor can output digital images, e.g. video, radar, LiDAR, ultrasonic, motion, thermal images. Determining an input signal which depends on said sensor signal and feeding said input signal into said classifier to obtain an output signal that characterizes a classification of said input signal.

In a further aspect of the present invention, said classifier, e.g. a neural network, may be endowed with such structure that it is trainable to identify and distinguish e.g. pedestrians and/or vehicles and/or road signs and/or traffic lights and/or road surfaces and/or human faces and/or medical anomalies in imaging sensor images. Alternatively, said classifier, e.g. a neural network, may be endowed with such structure that is trainable to identify spoken commands in audio sensor signals.

Such classifiers may then be used for providing an actuator control signal for controlling an actuator, comprising all the steps of the above method, and further comprising the step of:

determining said actuator control signal depending on said output signal

Preferably said actuator controls an at least partially autonomous robot and/or a manufacturing machine and/or an access control system.

Embodiments of the present invention will be discussed with reference to the figures in more detail.

DETAILED DESCRIPTION OF EXAMPLE EMBODIMENTS

Large amounts of data are a common requirement for many deep learning approaches. However, data is not always equally available at large scale for all classes. For example, on highly optimized production lines, defective samples are hardly acquired while non-defective samples come almost for free.

Generative Adversarial Networks (GANs) may be utilized to produce synthetic images for data augmentation. However, GANs are also notorious for requiring huge amounts of data for stable training. GANs that are trained with limited data either do not converge or generate unrealistic images.

For generating realistic scratches on different products, the scratches may only differ in few characteristics. Therefore, it is proposed to make use of the shared characteristics of defects by transferring a stylized defect-specific content from one type of background to another.

Generally, it is assumed that an image x comprises of a foreground y and a background p. The foreground of the image can be a part or an area of it that appears nearest to an observer or which part or area receives the most attention, in particular greatest interest by the observer. The background is in conclusion the remaining part of the image, which does not belong to the foreground.

For the embodiment of image generation of images which can depict defects, the foreground can be given by different defects. Defects can be anomalies in the image, in particular an anomaly with respect the background of the image. There could be a plurality of foreground domains $y \in Y$, each characterizing a defect type. A defect type can be a scratch, dent, or spot. Preferably, the foreground domain also comprises a domain 'no-defect'. The foreground domains $y \in Y$ could also referred to as defect class.

For said embodiment of defect image generation, the background could be a surface of a product, which preferably has been manufactured and is going be optically checked with respect to defects. It is also possible to define a plurality of background domains $p \in P$, wherein each background domain p characterizes a surface type. The surface type can be given by different material surfaces such as lacquer surface, plastic surface, or wood surface.

Preferably, the foreground domain y of the image x is changed in accordance to a given targe foreground domain while the background remains unaffected.

It is noted that the foreground can comprise one or several defects. The generator of the present invention can manage all defects of the same type in a given image. Like if there are 3 spots in an images, all 3 will be transfer.

Figure 1:
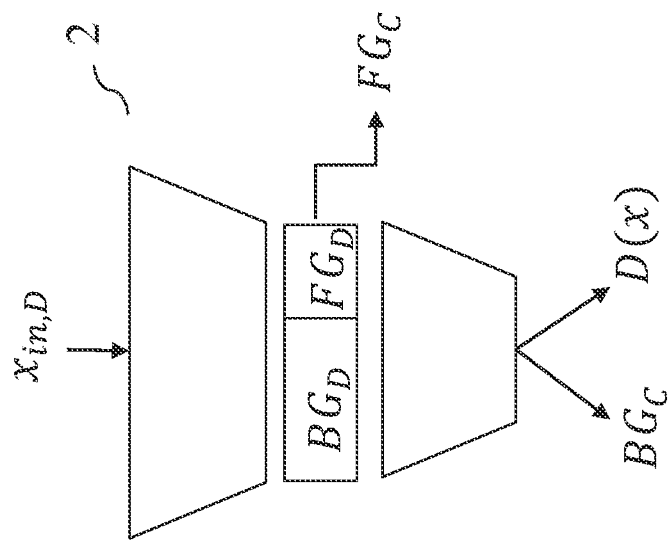
FIG. 1 shows an example of a generator and discriminator, according to the present invention.
Figure 1:
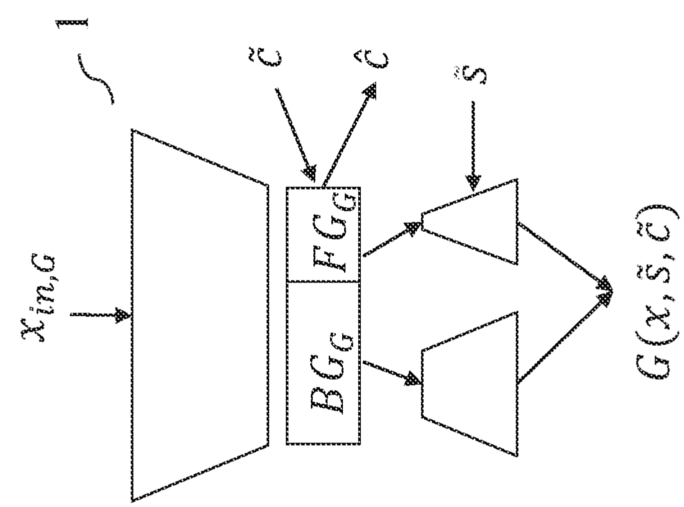
Figure 2:
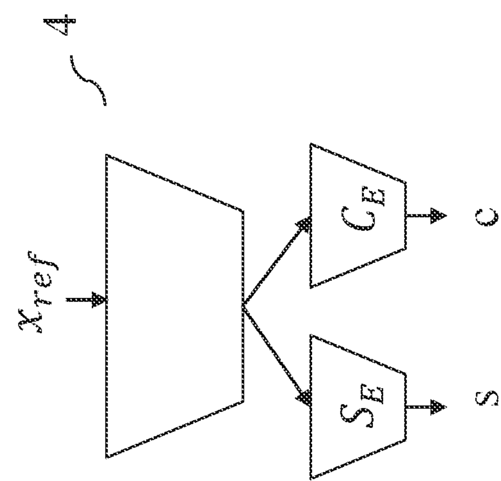
FIG. 2 shows an example of a Mapping network and a Style-Content encoder, according to the present invention.
Figure 2:
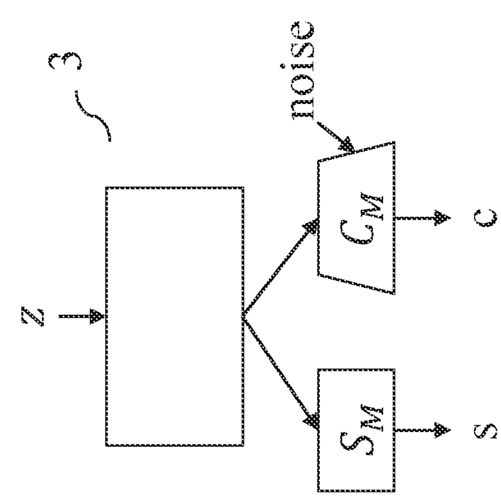

FIGS. 1 and 2 schematically depict different models utilized for learning a synthetic image generation by image-to-image translation in accordance with given target characteristics of the synthetic image, in particular a given target foreground domain, as well as a generator (1) for generating synthetic images in accordance with given target characteristics.

The generator (1) receives an input image $x_{in,G}$ and forwards it through its encoder part. At the information bottle neck of the generator (1), a latent feature map of the bottle neck is effectively divided into two parts. The split of the latent feature map could be either predefined or learned by a hyperparameter during training of the models. A first part $FG_G$ of the latent feature map comprises latent features characterizing foreground content, wherein a second part $BG_G$ of the latent feature map comprises latent features characterizing background content. When operating the generator (1), the second part of the latent feature map $BG_G$ is preserved and unchanged forwarded through the generator (1). However, the first part of the latent feature map $FG_G$ is extracted and can be outputted as $\hat{c}$ and/or replaced by a different feature map $\tilde{c}$ characterizing a different foreground. In other words, a new content $\tilde{c}$ can replace the original content of the first part of the feature map. Furthermore, when operating the generator (1), a style code $\tilde{s}$ can be injected by e.g. 'AdaIN' to modulate the style of the content through the decoding process. 'AdaIN' is described in the paper by Xun Huang and Serge Belongie, "Arbitrary style transfer in real-time with adaptive instance normalization," in Proceedings of the IEEE International Conference on Computer Vision (ICCV), October 2017.

At the output of the generator, the preserved background from the input image is separately decoded and merged, in particular superposed, with the decoded content in the last convolutional layer of the generator (1). Then, the generator (1) outputs the synthetic image $G(x, \tilde{s}, \tilde{c})$.

In other words, the generator (1) is configured to transform an input image $x_{in,G}$ into an output image $G(x, \tilde{s}, \tilde{c})$ according to given domain specific style code $\acute{s}$ and content $\tilde{c}$, which can be provided by different models, which are schematically depicted by FIG. 2.

A discriminator (2) receives an input image $x_{in,D}$ and encodes it into logits $D_y(x)$ that are used to discriminate if the input image is real (i.e. from the training set) or fake (i.e. synthetically generated by the generator (1)) considering the foreground domain y. In other words, each of the logits $D_y(x)$ characterizes whether the foreground domain of the image $x_{in,D}$ is a real image of its foreground domain y or a synthetic image. Due to the different logits of the discriminator (2), the discriminator (2) can be referred to as a multi-task discriminator.

Two auxiliary classifiers $BG_c$, $FG_c$ are attached to the discriminator (2). A foreground classifier $FG_c$ receives a feature map of the discriminator at one of the hidden layers. Preferably said feature map has the same resolution as the information bottle neck in the generator (1) to force the input image to contain the desired content $\tilde{c}$. Whereas the background classifier $BG_c$ is an extra branch at the output of the discriminator (2) to ensure the background information is preserved.

The new content and the style vectors $\tilde{s}$, $\tilde{c}$ are computed by one of the models depicted schematically by FIG. 2. The two models are a Mapping network (3) and Style-Content encoder (4), both output pairs of content and style code c, s.

The Mapping network (3) computes the content c and the style s vector from random noise z, which can provide novel contents and style vectors that are not in the training set. On the other hand, the Style-Content encoder (4) extracts the content c and the style s vector from a given reference image $x_{ref}$, which provides a way to transfer an existing content (i.e. defects) in the training set onto an image with different background.

In other words, the Mapping network (3) is configured to receive random noise z and a domain y, and generates a latent code, which is forwarded through two separate parts $S_M$, $C_M$ of the Mapping network (3). Then the two separate parts $S_M$, $C_M$ output the contents and style vectors respectively. The parts $S_M$, $C_M$ can be a MLP and a decoder respectively. In a further embodiment of the Mapping network (3), noise is injected into the separate part $C_M$. The noise injection significantly increases the diversity of the output content.

By randomly sampling z from a standard normal distribution and uniformly sampling y from all available foreground domains, the Mapping network (3) is then able to produce diverse style codes and domain-specific contents.

The Style-Content encoder (4) is similarly build as the Mapping Network (3) and extracts the style code $s=S_E(x_{ref})$ and content code $c=C_E(x_{ref})$ for a given image $x_{ref}$ of domain y. In other words, the Style-Content encoder (4) is configured to receive the reference input image $x_{ref}$ and extracts its style and content. Similar to the Mapping network (3), the Style-Content encoder (4) determines a latent code by a first encoder, wherein the latent code is forwarded through two separate parts $S_E$, $C_E$. The two separate parts $S_E$, $C_E$ output the contents and style vectors respectively. The two separate parts $S_E$, $C_E$ can be a second and third encoder.

To this end, all the domain specific content of normal images produced by either Mapping network or Style-Content encoder will be replaced by zero.

It can be said that the training of each of models of FIGS. 1 and 2 is carried out accordingly to the training of the StarGAN v2, but slightly modified some aspects in the loss function and by handling the latent feature map of the generator (1).

For splitting the latent feature map of the generator (1) into a foreground and background part $FG_G$, $BG_G$, a hyper-parameter can be introduced, which characterized the split of said latent feature map and thereby an optimal split can be learned.

In the training phase, noise z and a target foreground domain $\tilde{y} \in Y$ is randomly sampled and the Mapping network (3) outputs a target style $\tilde{s}$ and target content $\tilde{c}$. Formally, this can be expressed by: $\tilde{s}, \tilde{c} = M_{\tilde{y}}(z)$.

The generator (1) takes as input the input image $x_{in,G}$ and receives the target style s and target content $\tilde{c}$ and learns according to an adversarial loss to generate images which are indistinguishable from real images for the discriminator (2). The adversarial loss can be given as follows:

$$L_{adv}=E_{x,y}[\log D_y(x)]+E_{x,\tilde{y},z}[\log(1-D_{\tilde{y}}(x,\tilde{s},\tilde{c}))] \quad \text{(eq.1):}$$

where $D_y$ is the logit of the output branch of discriminator (2) that corresponds to the foreground domain y.

Additionally, a style-content reconstruction loss can be defined as follows:

$$L_{sty\_con}=E_{x,\tilde{y},z}[|\tilde{s}-S_E(G(x,\tilde{s},\tilde{c})|]+E_{x,\tilde{y},z}[|\tilde{c}-C_E(G(x,\tilde{s},\tilde{c})|] \quad \text{(eq.2):}$$

where |•| refers to a norm, preferably the $L_1$ norm.

The style-content reconstruction loss $L_{sty\_con}$ has the advantage that the Style-Content encoder (4) is trained as well as the $\tilde{s}$ generator (1) is forced to really consider the target style and target content $\tilde{c}$.

Additionally, a diversity loss can be defined as follows:

$$L_{ds}=E_{x,\tilde{y},z_1,z_2}[|G(x,\tilde{s}_1,\tilde{c}_2)-G(x,\tilde{s}_2,\tilde{c}_1)|]+E_{x,\tilde{y},z_1,z_2}[|G(x,\tilde{s}_1,\tilde{c}_2)-G(x,\tilde{s}_1,\tilde{c}_1)|]+E_{x,\tilde{y},z_1,z_2}[|G(x,\tilde{s}_1,\tilde{c}_2)-G(x,\tilde{s}_2,\tilde{c}_2)|]+E_{x,\tilde{y},z_1,z_2}[|G(x,\tilde{s}_2,\tilde{c}_2)-G(x,\tilde{s}_1,\tilde{c}_1)|]+E_{x,\tilde{y},z_1,z_2}[|G(x,\tilde{s}_2,\tilde{c}_2)-G(x,\tilde{s}_2,\tilde{c}_2)|]+E_{x,\tilde{y},z_1,z_2}[|G(x,\tilde{s}_1,\tilde{c}_1)-G(x,\tilde{s}_2,\tilde{c}_2)|] \quad \text{(eq.3):}$$

The diversity loss $L_{ds}$ has the advantage that it boosts the diversity of output images from the generator (1) as it encourages diversity by enforcing different outcomes of the generator for different mixed styles and mixed contents $\tilde{s}_i$, $\tilde{c}_i$ for i=1, 2.

Additionally, a cycle consistency loss can be defined as follows:

$$L_{cyc}=E_{x,y,\tilde{y},z}[|x-G(G(x,\tilde{s},\tilde{c}),\hat{s},\hat{c})|] \quad \text{(eq.4):}$$

where $\hat{s}$, $\hat{c}$ represents the extracted style and content of the image x with foreground domain y by the Style-Content encoder (4).

Additionally, a content consistency loss can be defined as follows:

$$L_{con\_cyc}=E_{x,y,\tilde{y},z}[|FG_G(G(G(x,\tilde{s},\tilde{c}),\hat{s},\hat{c}))-\tilde{c}|]+E_{x,y,\tilde{y},z}[|FG_G(G(x,\tilde{s},\tilde{c}))-\hat{c}|] \quad \text{(eq.5):}$$

where $FG_G(G(G(x, \tilde{s}, \tilde{c}), \hat{s}, \hat{c}))$ and $FG_G(G(x, \tilde{s}, \tilde{c}))$ are the pop-out domain specific content from input image x and synthetic image $G(x, \tilde{s}, \tilde{c})$ respectively.

The cycle consistency loss forces the generator to preserve original characteristics. Surprisingly, this also further encouraged to disentangle the background content.

For the discriminator (2), a first classification loss can be defined as follows:

$$L_{cls\_fore}=E_{x_{real},y}[-\log D_{cls\_fore}(y|x_{real})]E_{x_{synth},\tilde{y}}[-\log D_{cls\_fore}(\tilde{y}|G(x,s,c)] \quad \text{(eq.6):}$$

which aims to ensure the specific content is properly encoded and carries enough information from the target foreground domain. $D_{cls\_fore}$ refers to the output of the foreground classifier $FG_c$ of the discriminator (2).

The second classification loss can be defined as follows:

$$L_{cls\_back}=E_{x_{real},p}[-\log D_{cls\_back}(p|x_{real})]E_{x_{synth},p}[-\log D_{cls\_back}(p|G(x,s,c))] \quad \text{(eq.7):}$$

wherein $D_{cls\_back}$ refers to the output of the background classifier $BG_c$ of the discriminator (2) and p corresponds to the background domains of $x_{real}$ and to the background of the generated image G(x, s, c).

The second classification loss has the advantage that with the help of this objective, the generator learns to preserve the domain-invariant characteristics of its input image while dissociating the domain specific part.

The full training objective can be given as follows:

$$\min_{G,E,M}\max_{D} L_{adv}+\lambda_1 L_{sty\_con}-\lambda_2 L_{ds}+\lambda_3 L_{cyc}+\lambda_4 L_{con\_cyc}+\lambda_5 L_{cls\_fore}+\lambda_6 L_{cls\_back}+\lambda_7 L_1$$

where $\lambda_n$ are Hyperparameters of the losses and $L_1$ represents a regularization term, which is preferably a $L_1$ norm of the generated and extracted content codes.

Assume that there is an adequate amount of normal i.e. non-defective samples available, while anomaly samples are rare and hard to acquire. One can treat the normal samples as an anchor domain for other domains to identify the anomaly content.

Figure 3:
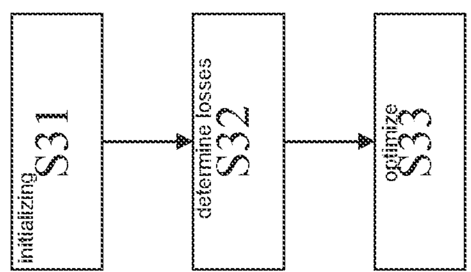
FIG. 3 shows a flow diagram of a method for training the generator, according to an example embodiment of the present invention.

FIG. 3 shows an embodiment for training the models of FIGS. 1 and 2.

The method can start with step S31. This step can be referred to as "Initializing". In this step, the models of FIGS. 1 and 2 are initialized, e.g. its parameters are randomly initialized.

Then, step S32 follows. Herein, the above discussed losses are determined.

Then, step S33 follows. Herein, the eq. 8 is optimized such that the generator (1) and the Mapping network (3) and the Style-Content encoder (4) minimize the sum of the losses and the discriminator (2) maximizes the losses. In other words, the known min-max optimization of the GAN loss is carried out.

After the optimization of S33 has terminated, the step S32 and S33 can be repeated with different images as input for the models.

Figure 4:
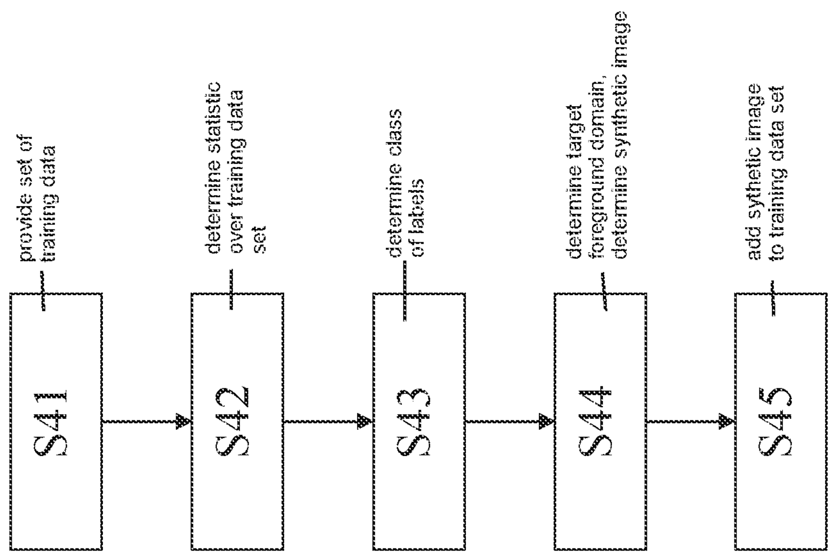
FIG. 4 shows a flow diagram of a method for operating the generator, according to an example embodiment of the present invention.

FIG. 4 shows an embodiment for operating the trained generator (1), preferably, the generator has been trained according to the described method of FIG. 3.

The method starts with step S41. Here, a set of training data for an optical surface defect detector is provided. This training data set can comprise images of surfaces of one manufactured product or of a plurality of different manufactured products. A label characterizing whether a defect is depicted is assigned to each of the images of the training data. Preferably, the labels also characterize a type of the defect.

Afterwards, step S42 is carried out. In this step, a statistic over the training data set about e.g. a distribution of the labels is determined.

In the subsequent step S43, the class of labels is determined depending on the statistic which is for example underrepresented in the training data set.

In step S44, depending on the underrepresented label, a target foreground domain is determined. Either with the Mapping network (3) or with the Style-Content encoder (4) and with the target foreground domain, the target style code and target content code are determined.

Afterwards, a selected image of the training data set and the target style code and target content code are provided to the generator (1). Then, the generator (1) determined the synthetic image.

After the synthetic image is outputted by the generator (1), said image is added to the training data set by step S45. It is noted that a label is assigned to said image in accordance with the determined label of step S43.

Subsequently, in an optional step, the steps S43-S45 can be repeated until e.g. a balanced training data set is present.

Optionally, the defect detector is trained with the augmented training data set of step S45.

For a different embodiment, the training data set comprises images of road scenes, wherein the training data set is utilized to train an image classifier or object detector to classify objects in these images. The foreground domain can characterize different objects like different traffic participants or road signs.

Figure 5:
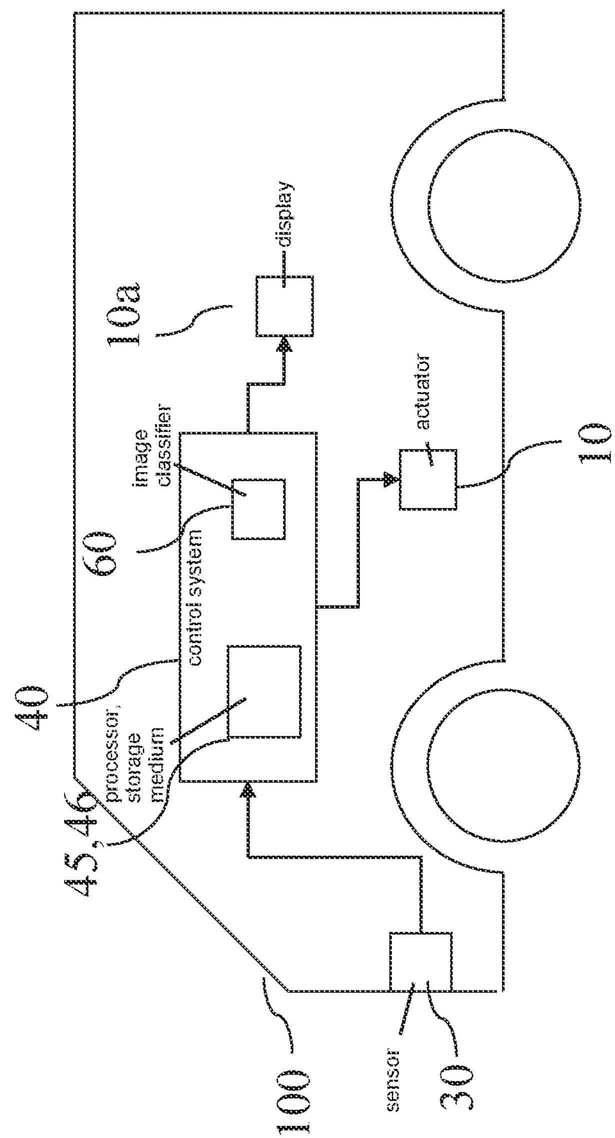
FIG. 5 shows a control system controlling an at least partially autonomous robot, according to an example embodiment of the present invention.

Shown in FIG. 5 is one embodiment of an actuator with a control system 40. Actuator and its environment will be jointly called actuator system. At preferably evenly spaced distances, a sensor 30 senses a condition of the actuator system. The sensor 30 may comprise several sensors. Preferably, sensor 30 is an optical sensor that takes images of the environment. An output signal S of sensor 30 (or, in case the sensor 30 comprises a plurality of sensors, an output signal S for each of the sensors) which encodes the sensed condition is transmitted to the control system 40.

Thereby, control system 40 receives a stream of sensor signals S. It then computes a series of actuator control commands A depending on the stream of sensor signals S, which are then transmitted to actuator unit 10 that converts the control commands A into mechanical movements or changes in physical quantities. For example, the actuator unit 10 may convert the control command A into an electric, hydraulic, pneumatic, thermal, magnetic and/or mechanical movement or change. Specific yet non-limiting examples include electrical motors, electroactive polymers, hydraulic cylinders, piezoelectric actuators, pneumatic actuators, servomechanisms, solenoids, stepper motors, etc.

Control system 40 receives the stream of sensor signals S of sensor 30 in an optional receiving unit 50. Receiving unit 50 transforms the sensor signals S into input signals x. Alternatively, in case of no receiving unit 50, each sensor signal S may directly be taken as an input signal x. Input signal x may, for example, be given as an excerpt from sensor signal S. Alternatively, sensor signal S may be processed to yield input signal x. Input signal x comprises image data corresponding to an image recorded by sensor 30. In other words, input signal x is provided in accordance with sensor signal S.

Input signal x is then passed on to the image classifier 60, which may, for example, be given by an artificial neural network, which has been trained with the augmented training data set according to FIG. 4.

Classifier 60 is parametrized by parameters □, which are stored in and provided by parameter storage.

Classifier 60 determines output signals y from input signals x. The output signal y comprises information that assigns one or more labels to the input signal x. Output signals y are transmitted to an optional conversion unit 80, which converts the output signals y into the control commands A. Actuator control commands A are then transmitted to actuator unit 10 for controlling actuator unit 10 accordingly. Alternatively, output signals y may directly be taken as control commands A.

Actuator unit 10 receives actuator control commands A, is controlled accordingly and carries out an action corresponding to actuator control commands A. Actuator unit 10 may comprise a control logic which transforms actuator control command A into a further control command, which is then used to control actuator 10.

In further embodiments, control system 40 may comprise sensor 30. In even further embodiments, control system 40 alternatively or additionally may comprise actuator 10.

In one embodiment classifier 60 may be designed to identify lanes on a road ahead, e.g. by classifying a road surface and markings on said road, and identifying lanes as patches of road surface between said markings. Based on an output of a navigation system, a suitable lane for pursuing a chosen path can then be selected, and depending on a present lane and said target lane, it may then be decided whether vehicle 60 is to switch lanes or stay in said present lane. Control command A may then be computed by e.g. retrieving a predefined motion pattern from a database corresponding to said identified action.

Likewise, upon identifying road signs or traffic lights, depending on an identified type of road sign or an identified state of said traffic lights, corresponding constraints on possible motion patterns of vehicle may then be retrieved from e.g. a database, a future path of vehicle commensurate with said constraints may be computed, and said actuator control command A may be computed to steer the vehicle such as to execute said trajectory.

Likewise, upon identifying pedestrians and/or vehicles, a projected future behavior of said pedestrians and/or vehicles may be estimated, and based on said estimated future behavior, a trajectory may then be selected such as to avoid collision with said pedestrian and/or said vehicle, and said actuator control command A may be computed to steer the vehicle such as to execute said trajectory.

In still further embodiments, it may be envisioned that control system 40 controls a display **10*a* instead of an actuator 10, wherein the display 10*a*** can display the control command or the like.

In other embodiments, the display **10*a*** can be an output interface to a rendering device, such as a display, a light source, a loudspeaker, a vibration motor, etc., which may be used to generate a sensory perceptible output signal which may be generated based on the output of the trained classifier or detector. The sensory perceptible output signal may be directly indicative of said output, but may also represent a derived sensory perceptible output signal, e.g., for use in guidance, navigation or other type of control of a computer-controlled system.

Furthermore, control system 40 may comprise a processor 45 (or a plurality of processors) and at least one machine-readable storage medium 46 on which instructions are stored which, if carried out, cause control system 40 to carry out a method according to one aspect of the present invention.

In a preferred embodiment of FIG. 5, the control system 40 is used to control the actuator, which is an at least partially autonomous robot, e.g. an at least partially autonomous vehicle 100.

Sensor 30 may comprise one or more video sensors and/or one or more radar sensors and/or one or more ultrasonic sensors and/or one or more LiDAR sensors and or one or more position sensors (like e.g. GPS). Some or all of these sensors are preferably but not necessarily integrated in vehicle 100.

Alternatively or additionally sensor 30 may comprise an information system for determining a state of the actuator system. One example for such an information system is a weather information system which determines a present or future state of the weather in environment 20.

For example, using input signal x, the classifier 60 may for example detect objects in the vicinity of the at least partially autonomous robot. Output signal y may comprise an information which characterizes where objects are located in the vicinity of the at least partially autonomous robot. Control command A may then be determined in accordance with this information, for example to avoid collisions with said detected objects.

Actuator unit 10, which is preferably integrated in vehicle 100, may be given by a brake, a propulsion system, an engine, a drivetrain, or a steering of vehicle 100. Actuator control commands A may be determined such that actuator (or actuators) unit 10 is/are controlled such that vehicle 100 avoids collisions with said detected objects. Detected objects may also be classified according to what the classifier 60 deems them most likely to be, e.g. pedestrians or trees, and actuator control commands A may be determined depending on the classification.

In further embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot. In all of the above embodiments, actuator command control A may be determined such that propulsion unit and/or steering and/or brake of the mobile robot are controlled such that the mobile robot may avoid collisions with said identified objects.

In a further embodiment, the at least partially autonomous robot may be given by a gardening robot (not shown), which uses sensor 30, preferably an optical sensor, to determine a state of plants in the environment 20. Actuator unit 10 may be a nozzle for spraying chemicals. Depending on an identified species and/or an identified state of the plants, an actuator control command A may be determined to cause actuator unit 10 to spray the plants with a suitable quantity of suitable chemicals.

In even further embodiments, the at least partially autonomous robot may be given by a domestic appliance (not shown), like e.g. a washing machine, a stove, an oven, a microwave, or a dishwasher. Sensor 30, e.g. an optical sensor, may detect a state of an object which is to undergo processing by the household appliance. For example, in the case of the domestic appliance being a washing machine, sensor 30 may detect a state of the laundry inside the washing machine. Actuator control signal A may then be determined depending on a detected material of the laundry.

Figure 6:
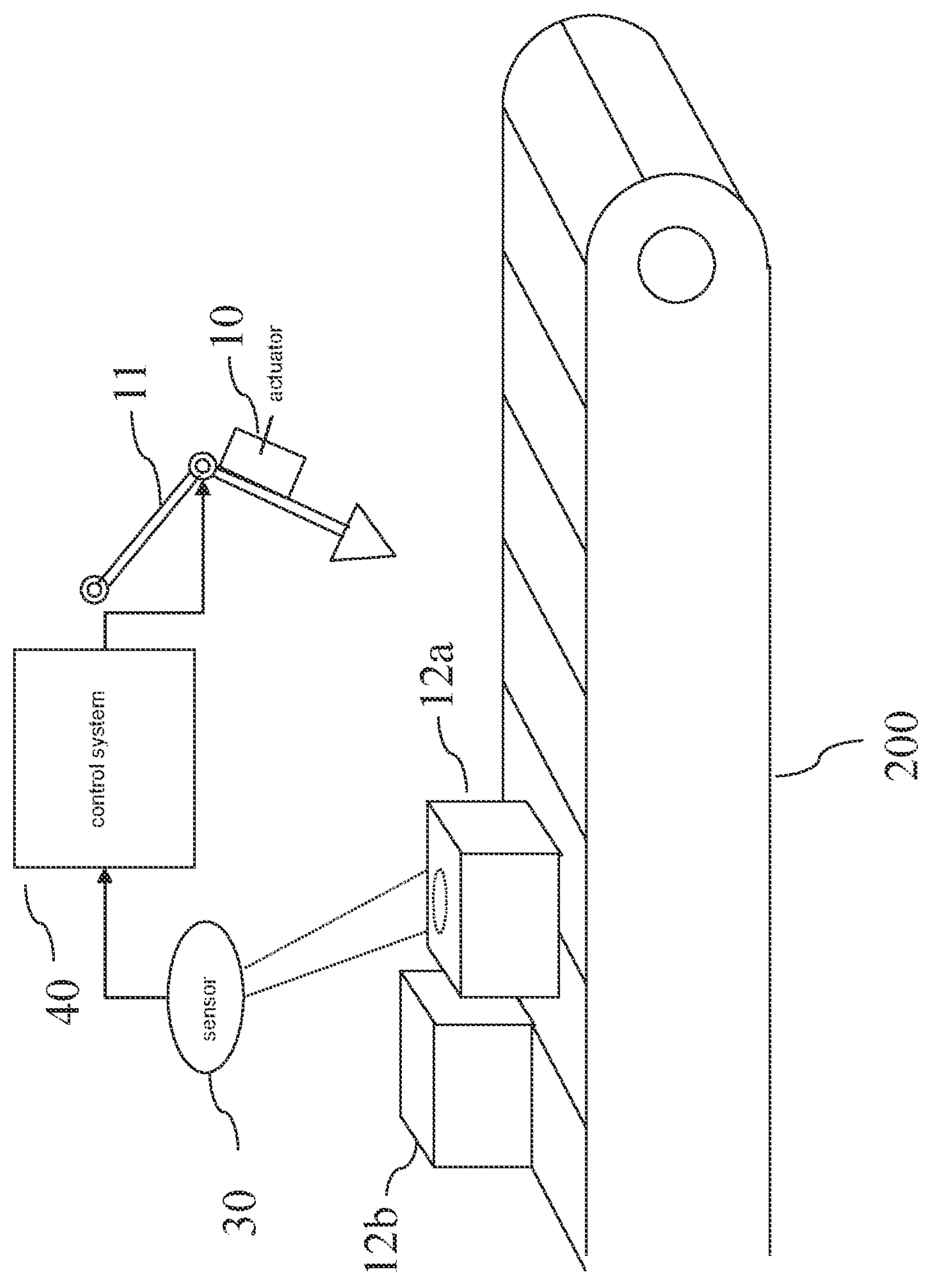
FIG. 6 shows a control system controlling a manufacturing machine, according to an example embodiment of the present invention.

Shown in FIG. 6 is an embodiment in which control system 40 is used to control a manufacturing machine 11, e.g. a punch cutter, a cutter or a gun drill or pick-and-place robot arm) of a manufacturing system 200, e.g. as part of a production line. The control system 40 controls an actuator unit 10 which in turn control the manufacturing machine 11.

Sensor 30 may be given by an optical sensor which captures properties of e.g. a manufactured product 12. Classifier 60 may determine a state of the manufactured product 12 from these captured properties. Actuator unit 10 which controls manufacturing machine 11 may then be controlled depending on the determined state of the manufactured product 12 for a subsequent manufacturing step of manufactured product 12. Or, it may be envisioned that actuator unit 10 is controlled during manufacturing of a subsequent manufactured product 12 depending on the determined state of the manufactured product 12.

Figure 7:
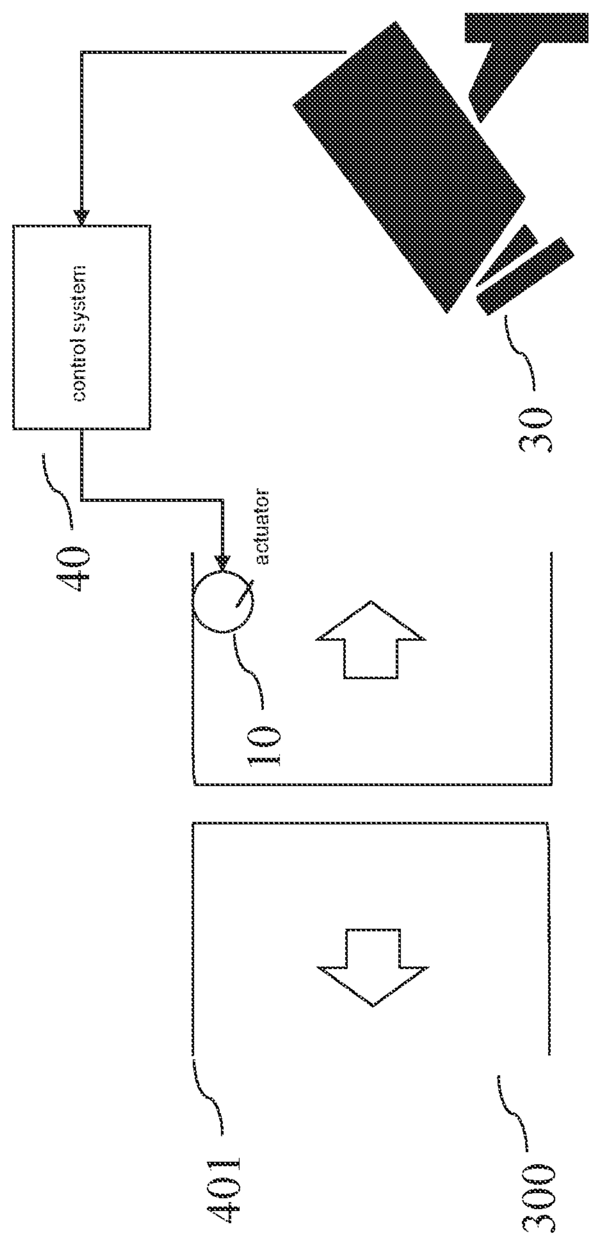
FIG. 7 shows a control system controlling an access control system, according to an example embodiment of the present invention.

Shown in FIG. 7 is an embodiment in which control system controls an access control system 300. Access control system may be designed to physically control access. It may, for example, comprise a door 401. Sensor 30 is configured to detect a scene that is relevant for deciding whether access is to be granted or not. It may for example be an optical sensor for providing image or video data, for detecting a person's face. Classifier 60 may be configured to interpret this image or video data e.g. by matching identities with known people stored in a database, thereby determining an identity of the person. Actuator control signal A may then be determined depending on the interpretation of classifier 60, e.g. in accordance with the determined identity. Actuator unit 10 may be a lock which grants access or not depending on actuator control signal A. A non-physical, logical access control is also possible.

Figure 8:
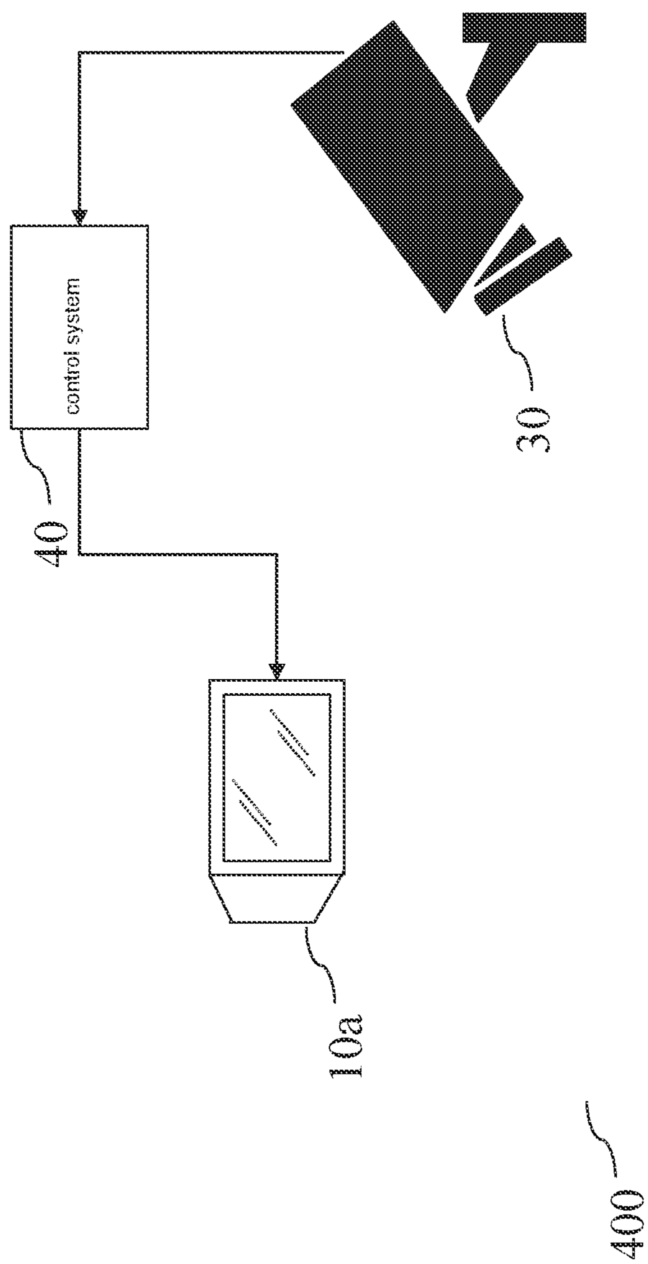
FIG. 8 shows a control system controlling a surveillance system, according to an example embodiment of the present invention.

Shown in FIG. 8 is an embodiment in which control system 40 controls a surveillance system 400. This embodiment is largely identical to the embodiment shown in FIG. 5. Therefore, only the differing aspects will be described in detail. Sensor 30 is configured to detect a scene that is under surveillance. Control system does not necessarily control an actuator 10, but a display 10*a*. For example, the machine learning system 60 may determine a classification of a scene, e.g. whether the scene detected by optical sensor 30 is suspicious. Actuator control signal A which is transmitted to display 10*a* may then e.g. be configured to cause display 10*a* to adjust the displayed content dependent on the determined classification, e.g. to highlight an object that is deemed suspicious by machine learning system 60.

Figure 9:
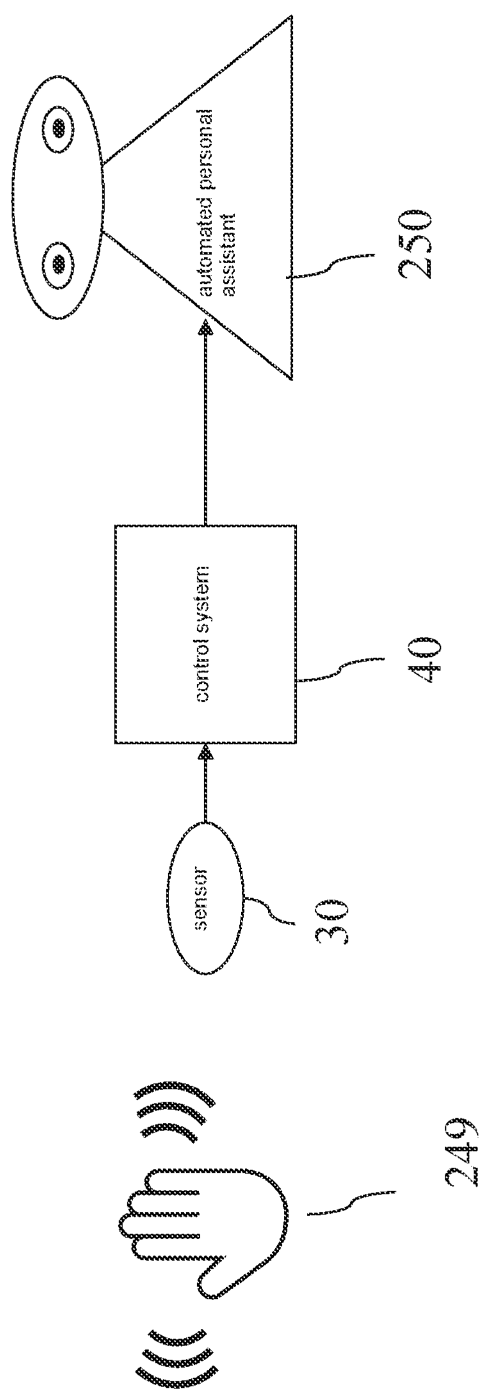
FIG. 9 shows a control system controlling an automated personal assistant, according to an example embodiment of the present invention.

Shown in FIG. 9 is an embodiment in which control system 40 is used for controlling an automated personal assistant 250. Sensor 30 may be an optic sensor, e.g. for receiving video images of a gestures of user 249. Alternatively, sensor 30 may also be an audio sensor e.g. for receiving a voice command of user 249.

Control system 40 then determines actuator control commands A for controlling the automated personal assistant 250. The actuator control commands A are determined in accordance with sensor signal S of sensor 30. Sensor signal S is transmitted to the control system 40. For example, classifier 60 may be configured to e.g. carry out a gesture recognition algorithm to identify a gesture made by user 249. Control system 40 may then determine an actuator control command A for transmission to the automated personal assistant 250. It then transmits said actuator control command A to the automated personal assistant 250.

For example, actuator control command A may be determined in accordance with the identified user gesture recognized by classifier 60. It may then comprise information that causes the automated personal assistant 250 to retrieve information from a database and output this retrieved information in a form suitable for reception by user 249.

In further embodiments, it may be envisioned that instead of the automated personal assistant 250, control system 40 controls a domestic appliance (not shown) controlled in accordance with the identified user gesture. The domestic appliance may be a washing machine, a stove, an oven, a microwave or a dishwasher.

Figure 10:
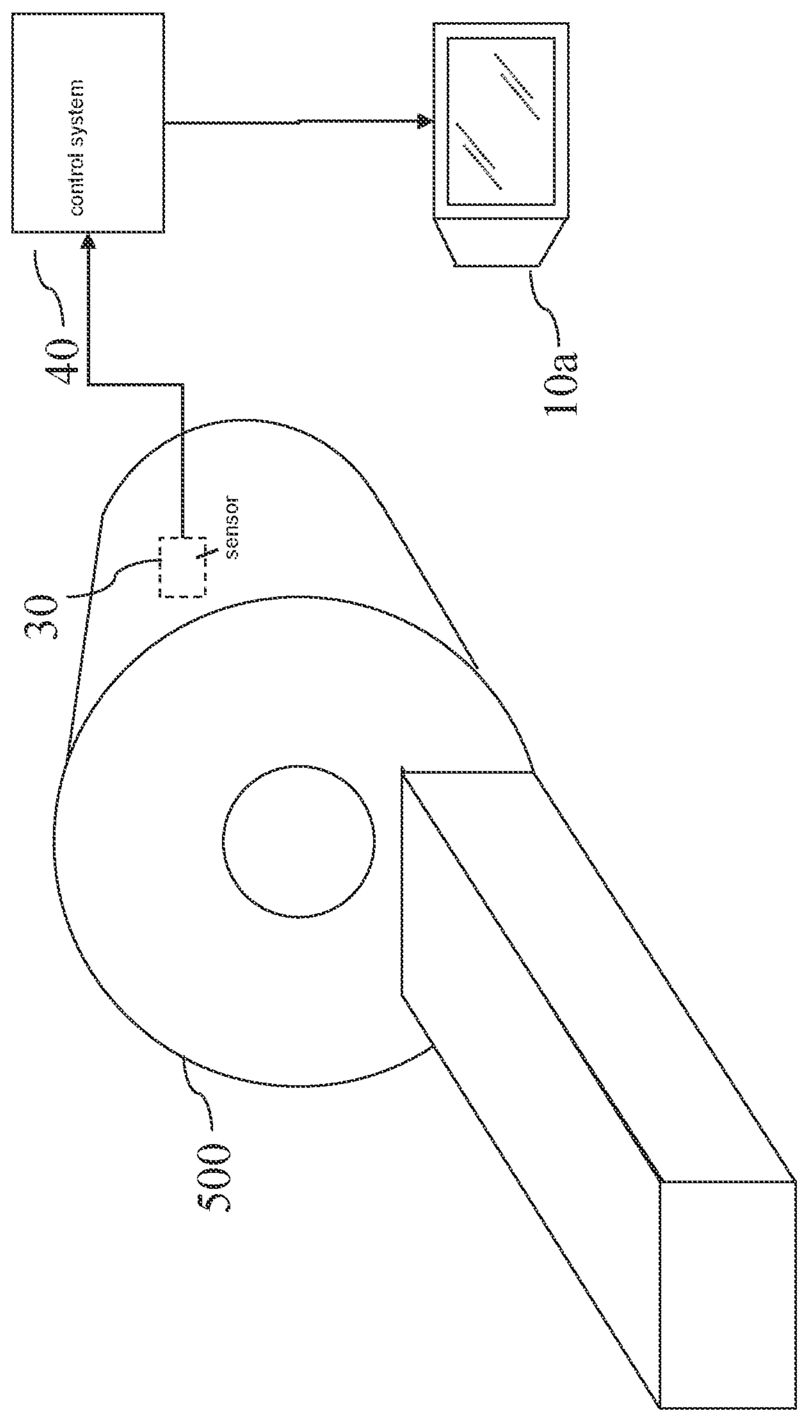
FIG. 10 shows a control system controlling an imaging system, according to an example embodiment of the present invention.

Shown in FIG. 10 is an embodiment of a control system 40 for controlling an imaging system 500, for example an MRI apparatus, x-ray imaging apparatus or ultrasonic imaging apparatus. Sensor 30 may, for example, be an imaging sensor. Machine learning system 60 may then determine a classification of all or part of the sensed image. Actuator control signal A may then be chosen in accordance with this classification, thereby controlling display 10*a*. For example, machine learning system 60 may interpret a region of the sensed image to be potentially anomalous. In this case, actuator control signal A may be determined to cause display 10*a* to display the imaging and highlighting the potentially anomalous region.

Figure 11:
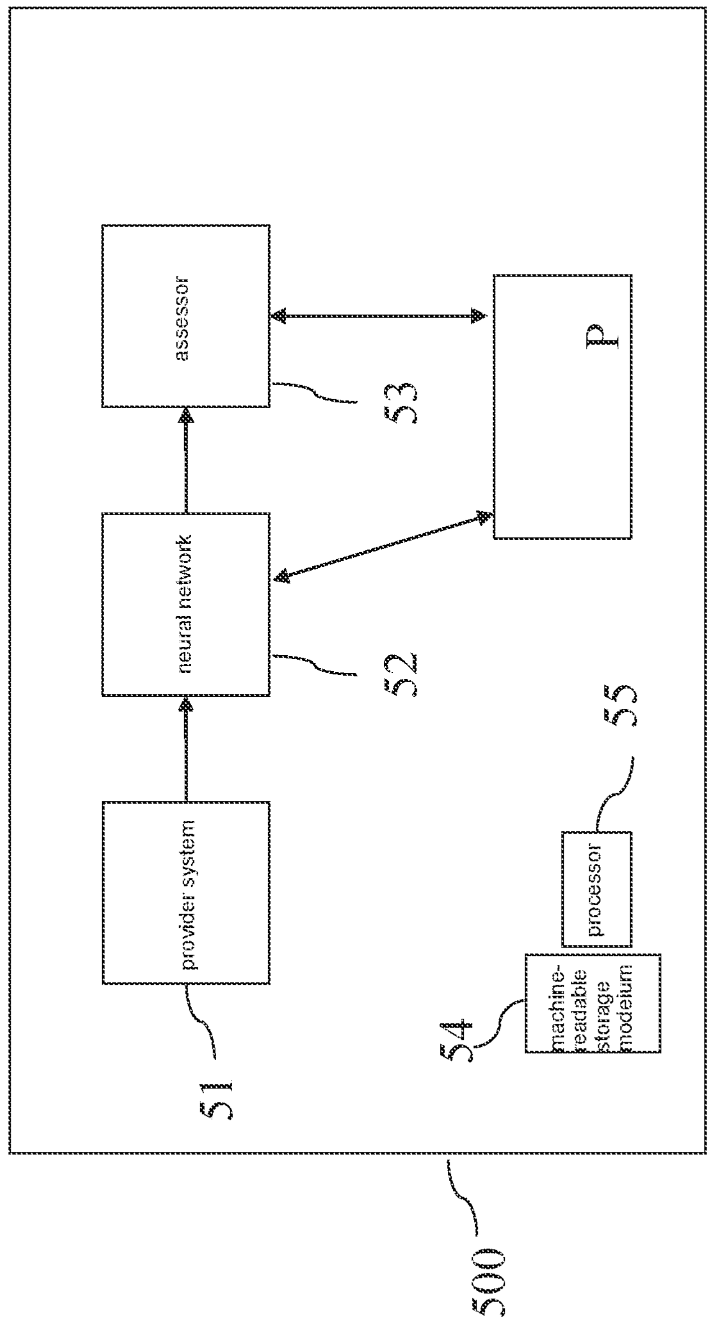
FIG. 11 shows a training system for controlling the classifier, according to an example embodiment of the present invention.

Shown in FIG. 11 is an embodiment of a training system 500. The training device 500 comprises a provider system 51, which provides input images from a training data set, wherein the training data set can be obtained according to step S45 of FIG. 2. Input images are fed to the neural network 52 to be trained e.g. as classifier or defect detector, which determines output variables from them. Output variables and input images are supplied to an assessor 53, which determines acute hyper/parameters therefrom, which are transmitted to the parameter memory P, where they replace the current parameters.

The training system 500 can also be used to train each of the models of FIGS. 1 and 2.

The procedures executed by the training device 500 may be implemented as a computer program stored on a machine-readable storage medium 54 and executed by a processor 55.

The term "computer" covers any device for the processing of predefined calculation instructions. These calculation instructions can be in the form of software, or in the form of hardware, or also in a mixed form of software and hardware.

It is further understood that the procedures cannot only be completely implemented in software as described. They can also be implemented in hardware, or in a mixed form of software and hardware.

What is claimed is:

1. A computer-implemented method for a generator for transforming a given image according to a given target foreground domain, comprising the following steps:

training the generator by:

generating a target style code and target content code by a Mapping network depending on the given target foreground domain;

propagating the given image through an encoder of the generator;

replacing a first part of a latent feature map outputted by the encoder with the generated target content code;

propagating the replaced first part of the latent feature map through a first decoder of the generator, wherein the target style code is injected into the first decoder, and propagating a second part of the latent feature map through a second decoder of the generator;

merging output of the first and second decoder of the generator to an output image of the generator;

propagating an input image through a discriminator, wherein the image is either the output image of the generator or an image from a training data set, wherein the discriminator outputs whether its input image is either an image of the training data set or generated by the generator, wherein the discriminator includes a first classifier and a second classifier, wherein the first classifier outputs a classification of a background of the input image of the discriminator and the second classifier outputs a classification of a foreground of the input image of the discriminator;

determining an adversarial loss depending on the output of the discriminator;

determining a style-content reconstruction loss by determining a difference between the target style code and an extracted style code by a Style-Content encoder depending on the output image of the generator and a difference between the target content code and an extracted content code by the Style-Content encoder depending on the output image of the generator; and optimizing the generator, the discriminator, the Mapping network, and the Style-Content encoder, subject to an objective that a sum of the adversarial loss and the style-content reconstruction loss is minimized by the generator and the Mapping network and the Style-Content encoder and the sum of the losses is maximized by the discriminator.

2. The method according to claim 1, wherein a first and second classification loss is determined depending on the output of the first and second classifiers and depending on assigned classes of the foreground and background classes of the input image of the discriminator, wherein the sum of losses of the objective also includes the first classification loss and the second classification loss.

3. The method according to claim 1, wherein a cycle consistency loss is determined, wherein the sum of losses of the objective also includes the cycle consistency loss.

4. The method according to claim 1, wherein a content consistency loss is determined, wherein the content consistency loss is determined depending on at least a difference between the first part of the latent feature map and the target content code, wherein the sum of losses of the objective also includes the content consistency loss.

5. The method according to claim 1, wherein a diversity loss is determined, wherein the diversity loss is configured to penalize a similarity between two outputted images of the generator for different target style code and target content code for the same target foreground domain, and wherein the sum of losses of the objective also includes the diversity loss.

6. The method according to claim 2, wherein a background of images of the training data set shows a product surface and a foreground is an anomaly of the background, including a defect on the product surface.

7. The method according to claim 1, wherein the transformation, which the generator that is trained is configured to perform, includes:

receiving an image to transform and predefined content and style codes obtained from the target style code and the target content code, both the predefined content code and the predefined style code characterizing the target foreground domain;

determining the latent feature map of the given image by propagating the image through the encoder of the generator;

replacing the first part of the latent feature map by the predefined content code;

propagating the replaced first part of the latent feature map through the first decoder of the generator and propagating the unchanged second part of the latent feature map through the second decoder of the generator, the predefined style code being injected into the first decoder of the generator;

merging outputs of the first decoder of the generator and the second decoder of the generator; and outputting the merged outputs as a transformed image.

8. The method according to claim 7, wherein the predefined content code and predefined style code are determined by the Mapping network or by the Style-Content encoder.

9. The method according to claim 7, further comprising:

adding the output transformed image of the transformation performed by the generator to the training data set; and training an optical surface defect detector depending on the training data set.

10. The method according to claim 9, wherein the trained optical surface defect detector receives a sensor signal including data from a sensor, determines an input signal which depends on the sensor signal, and feeds the input signal into the optical surface defect detector to obtain an output signal that characterizes a classification of the input signal.

11. The method according to claim 1, wherein the generator is configured for training an optical surface defect detector, the training of the optical surface defect detector being performed by:

receiving an image and predefined content and style codes obtained from the target style code and the target content code, both the predefined content code and the predefined style code characterizing the target foreground domain;

determining the latent feature map of the received image by propagating the image through the encoder of the generator;

replacing the first part of the latent feature map by the predefined content code;

propagating the replaced first part of the latent feature map through the first decoder of the generator and propagating the unchanged second part of the latent feature map through second decoder of the generator, the predefined style code being injected into the first decoder of the generator;

merging outputs of the first decoder of the generator and the second decoder of the generator; and outputting the merged outputs as a transformed image; and adding the output transformed image to the training data set, with the optical surface defect detector being trained based on the training data set, and an actuator control signal being determinable depending on an output signal of the trained optical surface defect detector.

12. A non-transitory machine-readable storage medium on which is stored a computer program training a generator for transforming a given image according to a given target foreground domain, the computer program, when executed by a computer, causing the computer to perform the following steps:

generating a target style code and target content code by a Mapping network depending on the given target foreground domain;

propagating the given image through an encoder of the generator;

replacing a first part of a latent feature map outputted by the encoder with the generated target content code;

propagating the replaced first part of the latent feature map through a first decoder of the generator, wherein the target style code is injected into the first decoder, and propagating a second part of the latent feature map through a second decoder of the generator;

merging output of the first and second decoder of the generator to an output image of the generator;

propagating an input image through a discriminator, wherein the image is either the output image of the generator or an image from a training data set, wherein the discriminator outputs whether its input image is either an image of the training data set or generated by the generator, wherein the discriminator includes a first classifier and a second classifier, wherein the first classifier outputs a classification of a background of the input image of the discriminator and the second classifier outputs a classification of a foreground of the input image of the discriminator;

determining an adversarial loss depending on the output of the discriminator;

determining a style-content reconstruction loss by determining a difference between the target style code and an extracted style code by a Style-Content encoder depending on the output image of the generator and a difference between the target content code and an extracted content code by the Style-Content encoder depending on the output image of the generator; and optimizing the generator, the discriminator, the Mapping network, and the Style-Content encoder, subject to an objective that a sum of the adversarial loss and the style-content reconstruction loss is minimized by the generator and the Mapping network and the Style-Content encoder and the sum of the losses is maximized by the discriminator.

13. An apparatus configured to train a generator for transforming a given image according to a given target foreground domain, the apparatus configured to:

generate a target style code and target content code by a Mapping network depending on the given target foreground domain;

propagate the given image through an encoder of the generator;

replace a first part of a latent feature map outputted by the encoder with the generated target content code;

propagate the replaced first part of the latent feature map through a first decoder of the generator, wherein the target style code is injected into the first decoder, and propagate a second part of the latent feature map through a second decoder of the generator;

merge output of the first and second decoder of the generator to an output image of the generator;

propagate an input image through a discriminator, wherein the image is either the output image of the generator or an image from a training data set, wherein the discriminator outputs whether its input image is either an image of the training data set or generated by the generator, wherein the discriminator includes a first classifier and a second classifier, wherein the first classifier outputs a classification of a background of the input image of the discriminator and the second classifier outputs a classification of a foreground of the input image of the discriminator;

determine an adversarial loss depending on the output of the discriminator;

determine a style-content reconstruction loss by determining a difference between the target style code and an extracted style code by a Style-Content encoder depending on the output image of the generator and a difference between the target content code and an extracted content code by the Style-Content encoder depending on the output image of the generator; and optimize the generator, the discriminator, the Mapping network, and the Style-Content encoder, subject to an objective that a sum of the adversarial loss and the style-content reconstruction loss is minimized by the generator and the Mapping network and the Style- Content encoder and the sum of the losses is maximized by the discriminator.

* * * * *